United States Patent
Matthews et al.

[11] Patent Number: 5,902,930
[45] Date of Patent: May 11, 1999

[54] METHOD FOR READING OUT A VIBRATORY ROTATION SENSOR

[75] Inventors: Anthony Matthews, Santa Barbara; Guy Thomas Varty, Woodland Hills, both of Calif.

[73] Assignee: Litton Systems, Inc., Woodland Hills, Calif.

[21] Appl. No.: 08/889,865

[22] Filed: Jul. 8, 1997

[51] Int. Cl.$^6$ .................................................. G01P 9/04
[52] U.S. Cl. ..................................... 73/504.02; 73/504.13
[58] Field of Search ........................... 73/504.02, 504.04, 73/504.12, 504.13

[56] References Cited

U.S. PATENT DOCUMENTS

| | | | |
|---|---|---|---|
| 4,157,041 | 6/1979 | Loper, Jr. et al. | 73/504.13 |
| 4,951,508 | 8/1990 | Loper, Jr. et al. | 73/504.13 |
| 5,383,362 | 1/1995 | Putty et al. | 73/504.01 |
| 5,712,427 | 1/1998 | Matthews | 73/504.04 |

*Primary Examiner*—Hezron Williams
*Assistant Examiner*—Richard A. Moller
*Attorney, Agent, or Firm*—Robert E. Malm

[57] ABSTRACT

The invention is a method for reading out a vibratory rotation sensor comprising the steps of (1) driving the vibratory rotation sensor with a plurality of driving signals and (2) obtaining one or more readout signals resulting from the interaction of the driving signals and the vibratory rotation sensor. The functional dependence of all tracking-angle-dependent driving signals is expressible for a specified range of tracking-angle values as a single specific function of the tracking angle. A tracking-angle-dependent driving signal is the sum of two or more component signals where only one of the component signals is dependent on tracking angle. The single specific function specified for any one of a plurality of tracking-angle range of values can be the same as or different than the single specific function specified for any other tracking-angle range of values. In the preferred embodiment of the invention, the single specific function is the tangent of twice the tracking angle for certain tracking-angle ranges of values and is the cotangent of twice the tracking angle for other tracking-angle ranges of values. The readout signal has a functional dependence on both the tracking angle and the difference of the orientation angle of the standing wave pattern associated with the vibratory rotation sensor and the tracking angle.

11 Claims, 3 Drawing Sheets

METHOD FOR READING OUT A VIBRATORY ROTATION SENSOR

BACKGROUND OF THE INVENTION

This invention relates generally to vibratory rotation sensors and more specifically to methods for reading out such rotation sensors.

A prior-art vibratory rotation sensor (VRS) 10 consisting of an outer member 12, a hemispherical resonator 14, and an inner member 16, all made of fused quartz and joined together with indium, is shown unassembled in FIG. 1. The inertially-sensitive element is the thin-walled, 5.8-cm-diameter hemispherical resonator 14 positioned between the outer member 12 and the inner member 16 and supported by the stem 26.

A ring forcer electrode 20 and sixteen discrete forcer electrodes 22 are deposited on the interior surface of the outer member 12. In the assembled VRS 10, the ring forcer electrode 20 and the sixteen discrete forcer electrodes 22 are in close proximity to the exterior metalized surface 32 of the hemispherical resonator 14. In the assembled VRS, eight pickoff electrodes 24 deposited on the inner member 16 are in close proximity to the interior metalized surface 30 of the hemispherical resonator 14.

Capacitive forces can be exerted on the hemispherical resonator 14 by means of appropriate forcing voltage differences between the hemispherical resonator 14 and the ring forcer electrode 20 to cause the hemispherical resonator to vibrate in the lowest-order inextensional (or flexing) mode. A standing wave is established having four antinodes at 90-degree intervals about the circumference with four nodes offset by 45 degrees from the four antinodes. The 0-degree and 180-degree antinodal points oscillate 180 degrees out of phase with 90-degree, and the 270-degree antinodal points. The standing wave causes the shape of the rim of the hemispherical resonator to change from circular to elliptical (with semi-major axis through the 0-degree/180-degree antinodes) to circular to elliptical (with semi-major axis through the 90-degree/270-degree antinodes.

Rotation of the VRS 10 about an axis normal to the plane of the hemispherical-resonator rim 34 causes the standing wave to rotate in the opposite direction with respect to the VRS by an angle proportional to the angle of rotation of the VRS 10. Thus, by measuring the angle of rotation of the standing wave with respect to the VRS 10, one can determine the angle of rotation of the VRS 10.

The vibrational mode of the hemispherical resonator 14 is excited by placing a DC bias voltage on the hemispherical resonator 14 and an AC voltage on the ring forcer electrode 20, the frequency of the AC voltage being twice the resonant frequency of the hemispherical resonator 14.

The standing-wave pattern angle with respect to the VRS 10 is determined by measuring the currents that flow into and out of the pickoff electrodes 24 as the hemispherical resonator 14 vibrates and the capacitances of the pickoff electrodes 24 with respect to the hemispherical resonator vary. An x axis signal $I_x$ is obtained from the combination $I_0-I_{90}+I_{180}-I_{270}$ where the subscripts identify the angular orientations relative to the x axis of the electrodes from which the currents originate. Similarly, a y axis signal $I_y$ is obtained from the combination $I_{45}-I_{135}+I_{225}-I_{315}$. The tangent of twice the standing-wave pattern angle with respect to the 0-degree (i.e. x) axis is given by the ratio of $I_y$ to $I_x$.

As a result of nonuniformities in the thickness of the hemispherical resonator 14, the establishment of a first standing wave will lead to the development of a second standing wave oscillating in phase quadrature with antinodes coinciding with the nodes of the first standing wave. The development of a second standing wave can be inhibited by placing appropriate voltages on the sixteen discrete forcer electrodes 22.

A DC bias voltage is typically maintained on the hemispherical resonator 14 in order to reduce the magnitudes of the AC forcing voltages applied to the ring forcer electrode 20 and the discrete forcer electrodes 22 and to make the force exerted on the resonator a linear function of the AC driving voltages. The presence of the DC bias voltage results in slow changes in the electrical properties of the VRS which have been attributed to capacitance changes caused by charge-migration phenomena taking place at or within the outer member 12 and the inner member 16. These slow changes have resulted in an unacceptably large performance degradation over time and special means have to be provided to compensate for these effects.

SUMMARY OF THE INVENTION

The invention is a method for reading out a vibratory rotation sensor comprising the steps of (1) driving the vibratory rotation sensor with a plurality of driving signals and (2) obtaining one or more readout signals resulting from the interaction of the driving signals and the vibratory rotation sensor.

One or more driving signals are tracking-angle dependent. The functional dependence of all tracking-angle-dependent driving signals is expressible for a specified range of tracking-angle values as a single specific function of the tracking angle. A tracking-angle-dependent driving signal is the sum of two or more component signals where only one of the component signals is dependent on tracking angle. The single specific function specified for any one of a plurality of tracking-angle range of values can be the same as or different than the single specific function specified for any other tracking-angle range of values.

In the preferred embodiment of the invention, the single specific function is the tangent of twice the tracking angle for certain tracking-angle ranges of values and is the cotangent of twice the tracking angle for other tracking-angle ranges of values.

The readout signal has a functional dependence on both the tracking angle and the difference of the orientation angle of the standing wave pattern associated with the vibratory rotation sensor and the tracking angle. This functional dependence of the readout signal is expressible as a fraction. The numerator of the fraction is a function of the difference of the orientation angle and the tracking angle, and the denominator of the fraction is a function of the tracking angle. In the preferred embodiment, the numerator function is either the sine or the cosine of twice the difference of the orientation angle and the tracking angle, and the denominator function is either the sine or the cosine of twice the tracking angle.

DESCRIPTION OF THE PREFERRED EMBODIMENTS

The preferred embodiment of the invention will be described in the context of a vibratory rotation sensor for which the control and readout is accomplished with multiplexed signals. The vibratory rotation sensor which will serve in illustrating the use of the invention consists of a resonator, a housing to which the resonator is attached, and multiplex electronics. The resonator can be any rotationally-symmetric thin-walled object having standing-wave vibration modes. The prior art typically suggests that the resonator be hemispherical in shape.

Figure 1:
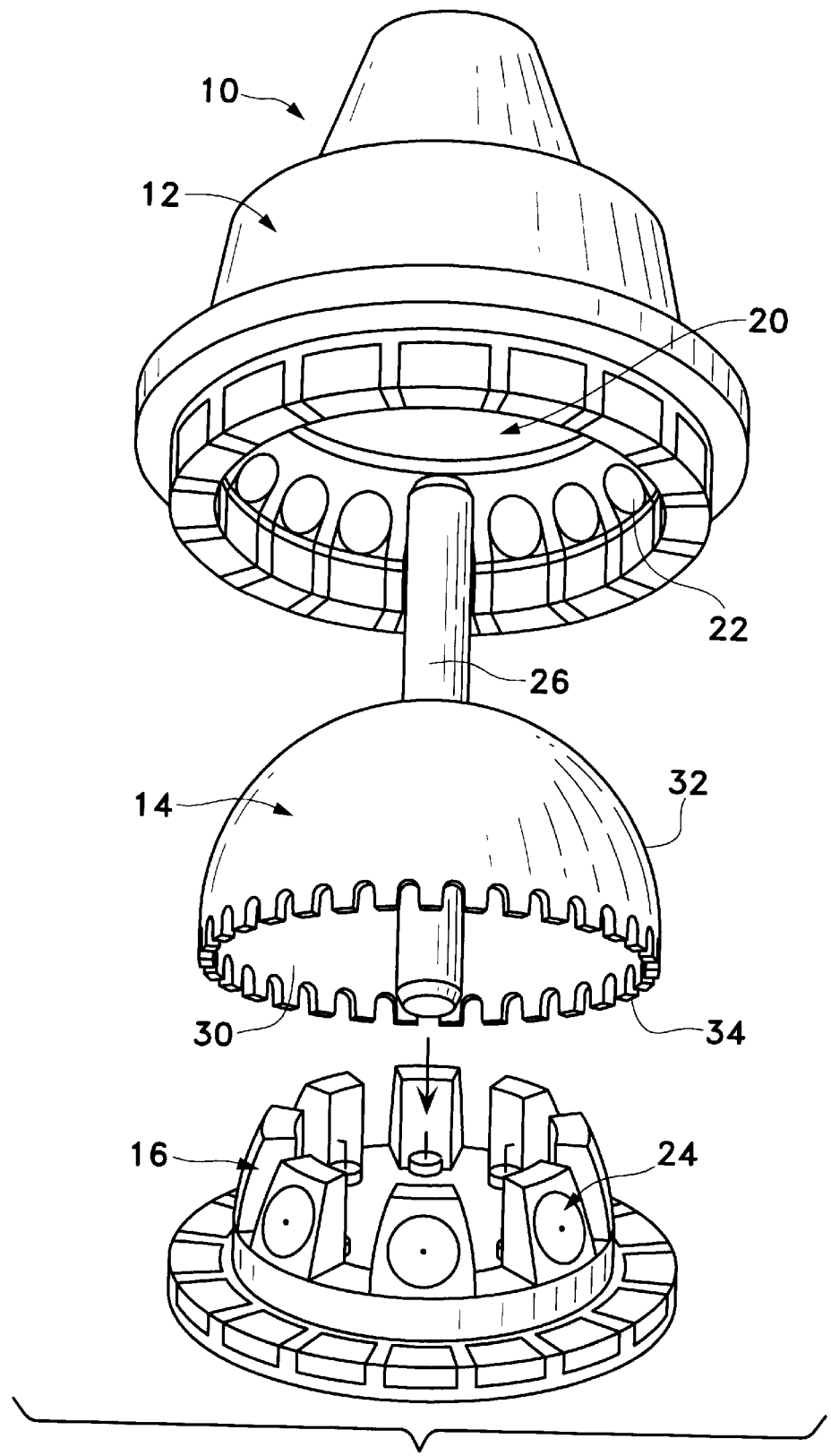
FIG. 1 shows the structure of a prior-art vibratory rotation sensor.
Figure 2:
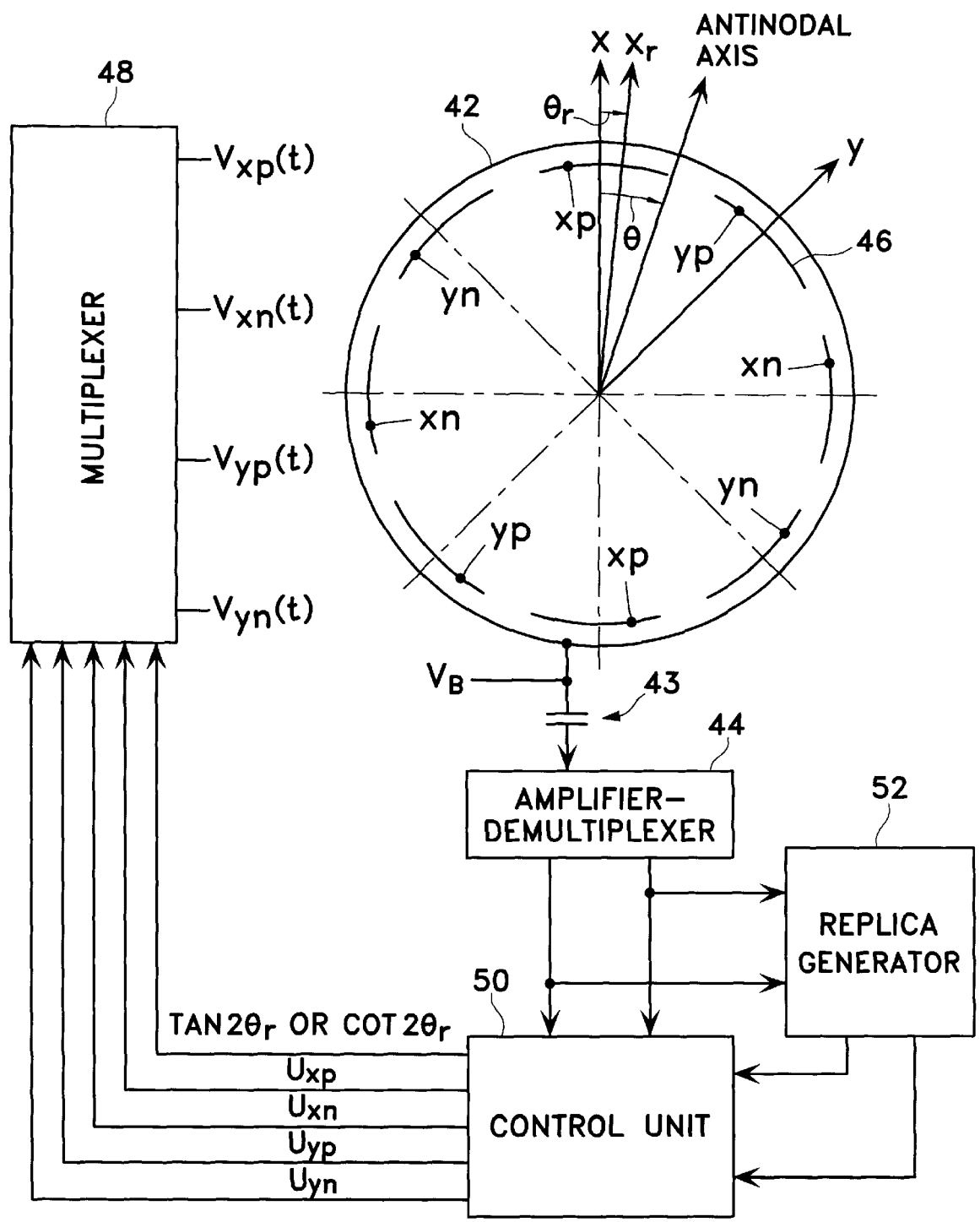
FIG. 2 shows a block diagram of the control and readout electronics for the invention.

A simplified method for determining the parameters of the standing waves and controlling the dynamics of the resonator is illustrated in FIG. 2. The standing waves are describable with respect to x and y axes fixed with respect to the resonator. The orientation of the inphase standing wave with respect to the resonator can be specified by the orientation angle $\theta$ of an inphase antinodal axis measured clockwise from the x axis. The deviation of the resonator rim from a circle along the inphase antinodal axis is assumed to vary as $\cos(\omega t+\phi)$ where $\omega$ is the vibration frequency, t is time, and $\phi$ is an arbitrary phase angle. The orientation of the quadrature standing wave with respect to the resonator is specified by the orientation angled $\theta+\pi/4$ of a quadrature antinodal axis measured clockwise from the x axis. The deviation of the resonator rim from a circle along the quadrature antinodal axis is assumed to vary as $\sin(\omega t+\phi)$.

The circumferentially-continuous resonator electrode 42, deposited on the interior surface of the resonator, is biased to a DC voltage $V_B$ and is connected through a DC-blocking capacitor 43 to the amplifier-demultiplexer 44. Eight electrodes 46 attached to the VRS housing are equally spaced about the circumference in close proximity to the resonator electrode 42, the uppermost xp electrode being centered on the x-axis. The eight electrodes 46 are supplied with the driving voltages $V_{xpk}(t)$, $V_{xnk}(t)$, $V_{ypk}(t)$, and $V_{ynk}(t)$ from the multiplexer 48 where $$V_{xpk}(t)=A_k(2\theta_r)V_{mxr}(t)\cos 2\theta_r \cos(\omega_{xr}t+\psi_{xr})-A_k(2\theta_r)V_{myr}(t)\sin 2\theta_r \cos(\omega_{yr}t+\psi_{yr})+V_{cx}(t)U_{xp}(t)$$

$$V_{xnk}(t)=-A_k(2\theta_r)V_{mxr}(t)\cos 2\theta_r \cos(\omega_{xr}t+\psi_{xr})+A_k(2\theta_r)V_{myr}(t)\sin 2\theta_r \cos(\omega_{yr}t+\psi_{yr})+V_{cx}(t)U_{xn}(t)$$

$$V_{ypk}(t)=A_k(2\theta_r)V_{mxr}(t)\sin 2\theta_r \cos(\omega_{xr}t+\psi_{xr})+A_k(2\theta_r)V_{myr}(t)\cos 2\theta_r \cos(\omega_{yr}t+\psi_{yr})+V_{cy}(t)U_{yp}(t)$$

$$V_{ynk}(t)=-A_k(2\theta_r)V_{mxr}(t)\sin 2\theta_r \cos(\omega_{xr}t+\psi_{xr})-A_k(2\theta_r)V_{myr}(t)\cos 2\theta_r \cos(\omega_{yr}t+\psi_{yr})+V_{cy}(t)U_{yn}(t) \quad (1)$$

and $$A_1(2\theta_r) = \frac{1}{\cos(2\theta_r)} \quad (2)$$

$$A_2(2\theta_r) = \frac{1}{\sin(2\theta_r)}$$

Thus $$V_{xp1}(t)=V_{mxr}(t)\cos(\omega_{xr}t+\psi_{xr})-V_{myr}(t)\tan 2\theta_r \cos(\omega_{yr}t+\psi_{yr})+V_{cx}(t)U_{xp}(t)$$

$$V_{xn1}(t)=-V_{mxr}(t)\cos(\omega_{xr}t+\psi_{xr})+V_{myr}(t)\tan 2\theta_r \cos(\omega_{yr}t+\psi_{yr})+V_{cx}(t)U_{xn}(t)$$

$$V_{yp1}(t)=V_{mxr}(t)\tan 2\theta_r \cos(\omega_{xr}t+\psi_{xr})+V_{myr}(t)\cos(\omega_{yr}t+\psi_{yr})+V_{cy}(t)U_{yp}(t)$$

$$V_{yn1}(t)=-V_{mxr}(t)\tan 2\theta_r \cos(\omega_{xr}t+\psi_{xr})-V_{myr}(t)\cos(\omega_{yr}t+\psi_{yr})+V_{cy}(t)U_{yn}(t) \quad (3)$$

and $$V_{xp2}(t)=V_{mxr}(t)\cot 2\theta_r \cos(\omega_{xr}t+\psi_{xr})-V_{myr}(t)\cos(\omega_{yr}t+\psi_{yr})+V_{cx}(t)U_{xp}(t)$$

$$V_{xn2}(t)=-V_{mxr}(t)\cot 2\theta_r \cos(\omega_{xr}t+\psi_{xr})+V_{myr}(t)\cos(\omega_{yr}t+\psi_{yr})+V_{cx}(t)U_{xn}(t)$$

$$V_{yp2}(t)=V_{mxr}(t)\cos(\omega_{xr}t+\psi_{xr})+V_{myr}(t)\cot 2\theta_r \cos(\omega_{yr}t+\psi_{yr})+V_{cy}(t)U_{yp}(t)$$

$$V_{yn2}(t)=-V_{mxr}(t)\cos(\omega_{xr}t+\psi_{xr})-V_{myr}(t)\cot 2\theta_r \cos(\omega_{yr}t+\psi_{yr})+V_{cy}(t)U_{yn}(t) \quad (4)$$

At any particular time, the driving voltages correspond to some particular value of k. The value of k is chosen so that the magnitudes of the driving voltages remain at practical levels. For example, the k=1 driving voltages might be used for values of $2\theta_r$ between $7\pi/4$ and $\pi/4$ and between $3\pi/4$ and $5\pi/4$ where $\tan 2\theta_r$ is less than or equal to one. The k=2 driving voltages might be used for values of $2\theta_r$ between $\pi/4$ and $3\pi/4$ and between $5\pi/4$ and $7\pi/4$ where $\cot 2\theta_r$ is less than or equal to one. It should be noted that the driving voltages require the computation of only one function of the quantity $2\theta_r$ at any particular time.

The excitation voltages $V_{mxr}(t)\cos(\omega_{xr}t+\psi_{xr})$ and $V_{myr}(t)\cos(\omega_{yr}t+\psi_{yr})$ are components is the $x_r$-$y_r$ tracking-angle coordinate system of FIG. 2 (denoted by the r in the subscripts). The preferred embodiments of the excitation voltages include the sinusoids $\cos(\omega_{xr}t+\psi_{xr})$ and $\cos(\omega_{yr}t+\psi_{yr})$. There are a variety of periodic functions $F(\omega_{xr}t+\psi_{xr})$ which may be utilized instead of the sinusoids including ordinary square waves.

The $x_r$-axis is rotated clockwise from the x-axis by the tracking angle $\theta_r$. The excitation voltages are designed not to affect the parameters of a standing wave on the resonator. The angular frequencies $\omega_{xr}$ and $\omega_{yr}$ and phases $\psi_{xr}$ and $\psi_{yr}$ depend on the type of multiplexing being used. The forcing voltages $V_{cx}(t)U_{xp}(t)$, $V_{cx}(t)U_{xn}(t)$, $V_{cy}(t)U_{yp}(t)$, and $V_{cy}(t)U_{yn}(t)$ (expressed as components in the x-y coordinate system) cause forces to be applied to the resonator for the purpose of controlling the parameters of the one or more standing waves on the resonator. The functions $U_{xp}(t)$, $U_{xn}(t)$, $U_{yp}(t)$, and $U_{yn}(t)$ are generated by control unit 50 and supplied to multiplexer 48. The voltages $V_{cx}(t)$ and $V_{cy}(t)$ are predetermined functions used to isolate the forcing voltages from the excitation voltages.

The current I(t) flowing from the resonator electrode 42 into the amplifier-demultiplexer 44 is given by $$I(t)=I_{xp}(t)+I_{xn}(t)+I_{yp}(t)+I_{yn}(t) \quad (5)$$

where $$I_{xpk}(t)=K_I[A_kV_{mxr}(t)\omega_{xr}\cos 2\theta_r \cos(\omega_{xr}t+\psi_{xr})-A_kV_{myr}(t)\omega_{yr}\sin 2\theta_r \cos(\omega_{yr}t+\psi_{yr})+V_{cx}(t)\omega_{Uxp}U_{xp}(t)]C_{xp}$$

$$I_{xnk}(t)=K_I[-A_kV_{mxr}(t)\omega_{xr}\cos 2\theta_r \cos(\omega_{xr}t+\psi_{xr})+A_kV_{myr}(t)\omega_{yr}\sin 2\theta_r \cos(\omega_{yr}t+\psi_{yr})+V_{cx}(t)\omega_{Uxn}U_{xn}(t)]C_{xn}$$

$$I_{ypk}(t)=K_I[A_kV_{mxr}(t)\omega_{xr}\sin 2\theta_r \cos(\omega_{xr}t+\psi_{xr})+A_kV_{myr}(t)\omega_{yr}\cos 2\theta_r \cos(\omega_{yr}t+\psi_{yr})+V_{cy}(t)\omega_{Uyp}U_{yp}(t)]C_{yp}$$

$$I_{ynk}(t)=K_I[-A_kV_{mxr}(t)\omega_{xr}\sin 2\theta_r \cos(\omega_{xr}t+\psi_{xr})-A_kV_{myr}(t)\omega_{yr}\cos 2\theta_r \cos(\omega_{yr}t+\psi_{yr})+V_{cy}(t)\omega_{Uyn}U_{yn}(t)]C_{yn} \quad (6)$$

The capacitances $C_{xp}$, $C_{xn}$, $C_{yp}$, and $C_{yn}$ are the capacitances of the xp, xn, xp, and yn electrodes 46 with respect to the resonator electrode 42. The angular frequencies $\omega_{Uxp}$, $\omega_{Uxn}$, $\omega_{Uyp}$, and $\omega_{Uyn}$ are those associated with the corresponding U's and are typically equal to or less than $2\omega$ where $\omega$ is the resonator vibration frequency. The symbol $K_I$ denotes a constant. The phase differences between the driving voltages and the resulting currents are of no relevance and have been ignored in the equations above. The capacitances are given by $$C_{xp}=C_o[1+d_i \cos 2\theta \cos(\omega t+\phi) - d_q \sin 2\theta \sin(\omega t+\phi)]$$

$$C_{xn}=C_o[1-d_i \cos 2\theta \cos(\omega t+\phi) + d_q \sin 2\theta \sin(\omega t+\phi)]$$

$$C_{yp}=C_o[1+d_i \sin 2\theta \cos(\omega t+\phi) + d_q \cos 2\theta \sin(\omega t+\phi)]$$

$$C_{yn}=C_o[1-d_i \sin 2\theta \cos(\omega t+\phi) - d_q \cos 2\theta \sin(\omega t+\phi)] \quad (7)$$

where terms involving higher orders of $d_i$ and $d_q$ have been omitted. The effects of the higher-order terms are taken into account in subsequent processing operations. The quantity $C_o$ is the capacitance of the electrode pairs when the resonator is not excited, $d_i$ and $d_q$ are the maximum flexing amplitudes respectively of the inphase and quadrature modes divided by the gap between the resonator electrode 42 and the electrodes 46 when the resonator is not excited, $\theta$ is the angle between the antinode of take inphase standing wave and the x-axis, $\omega$ is the angular frequency of vibration of the resonator, and $\phi$ is an arbitrary phase angle.

Substituting the expressions for the capacitances in the current equations and summing to obtain I, we obtain $$I_k(t) = \qquad (8)$$
$$2K_I C_o A_k V_{mxr}(t)\omega_{xr}\cos(\omega_{xr}t + \psi_{xr})d_i\cos(2\theta - 2\theta_r)\cos(\omega t + \phi) -$$
$$2K_I C_o A_k V_{mxr}(t)\omega_{xr}\cos(\omega_{xr}t + \psi_{xr})d_q\sin(2\theta - 2\theta_r)\sin(\omega t + \phi) +$$
$$K_I V_{cx}(t)\omega_{Uxp}U_{xp}(t)C_{xp} + K_I V_{cx}(t)\omega_{Uxn}U_{xn}(t)C_{xn} +$$
$$2K_I C_o A_k V_{myr}(t)\omega_{yr}\cos(\omega_{yr}t + \psi_{yr})d_i\sin(2\theta - 2\theta_r)\cos(\omega t + \phi) +$$
$$2K_I C_o A_k V_{myr}(t)\omega_{yr}\cos(\omega_{yr}t + \psi_{yr})d_q\cos(2\theta - 2\theta_r)\sin(\omega t + \phi) +$$
$$K_I V_{cy}(t)\omega_{Uyp}U_{yp}(t)C_{yp} + K_I V_{cy}(t)\omega_{Uyn}U_{yn}(t)C_{yn}$$

The current I(t) is transformed into the voltage V(t) by the amplifier-demultiplexer 44:

$$V_k(t)=K_V[V_{xk}(t)R_x(t)+V_{yk}(t)R_y(t)]+K_F[F_x(t)+F_y(t)] \quad (9)$$

where $K_V$ and $K_F$ are constants, $$V_x(t)=V_{mxr}(t)\omega_{xr}\cos(\omega_{xr}t+\psi_{xr})$$

$$V_y(t)=V_{myr}(t)\omega_{yr}\cos(\omega_{yr}t+\psi_{yr})$$

$$R_{xk}(t)=A_k[d_i\cos(2\theta-2\theta_r)\cos(\omega t+\phi) - d_q\sin(2\theta-2\theta_r)\sin(\omega t+\phi)]$$

$$R_{yk}(t)=A_k[d_i\sin(2\theta-2\theta_r)\cos(\omega t+\phi) + d_q\cos(2\theta-2\theta_r)\sin(\omega t+\phi)] \quad (10)$$

and $$F_x(t)=V_{cx}(t)[\omega_{Uxp}U_{xp}(t)C_{xp}+\omega_{Uxn}U_{xn}(t)C_{xn}]$$

$$F_y(t)=V_{cy}(t)[\omega_{Uyp}U_{yp}(t)C_{yp}+\omega_{Uyn}U_{yn}(t)C_{yn}] \quad (11)$$

The signals $R_{xk}(t)$ and $R_{yk}(t)$ are the desired outputs from a demultiplexing process applied to V(t) since they contain the standing wave parameters $d_i$, $d_q$, $\theta-\theta_r$, $\omega$, and $\phi$.

Signals $S_x(t)$ and $S_y(t)$ containing the signals $R_{xk}(t)$ and $R_{yk}(t)$ are extracted by amplifier-demultiplexer 44. The operating principle of the demultiplexer portion of the amplifier-demultiplexer 44 depends on the form of the voltages $V_{mxr}(t)$, $V_{myr}(t)$, $V_{cx}(t)$, and $V_{cy}(t)$ and the values of $\omega_{xr}$, $\omega_{yr}$, $\psi_{xr}$, and $\psi_{yr}$.

For frequency-division multiplexing, $V_{mxr}(t)$, $V_{myr}(t)$, $V_{cx}(t)$, and $V_{cy}(t)$ are all equal to a constant, $\omega_{xr}$, $\psi_{yr}$, are $|\omega_{xr}-\omega_{yr}|$ are greater than about 6$\omega$, and $\psi_{xr}$, and $\psi_{yr}$ are arbitrary constants. The signals $R_x(t)$ and $R_y(t)$ which contain the standing-wave parameters are obtained by performing two product demodulations of V(t), one with respect to $\cos(\omega_{xr}t+\psi_{xr})$ and the other with respect to $\cos(\omega_{yr}t+\psi_{yr})$. If a periodic function other than a sinusoid is being used, then the demodulations proceed using replicas of the periodic functions. A product demodulation consists of multiplying the input voltage by the reference sinusoid (or replica) and lowpass filtering the product, the cutoff frequency of the lowpass filter being about 3$\omega$. The results of the above process are the signals $S_{FDMx}(t)$ and $S_{FDMy}(t)$:

$$S_{FDMx}(t)=K_{FDM}R_x(t)$$

$$S_{FDMy}(t)=K_{FDM}R_y(t) \quad (12)$$

where $K_{FDM}$ is a constant. Because the upper limit to the frequency spectrums of $F_x(t)$ and $F_y(t)$ are about 3$\omega$, these quantities are eliminated by the demultiplexing process.

For phase-division multiplexing, $\omega_{xr}$ and $\omega_{yr}$ have the same value $\omega_o$, $\omega_o$ being greater than about 6$\omega$, and $\psi_{xr}-\psi_{yr}$ is equal to $\pi/2$ radians. The signals $S_{PDMx}(t)$ and $S_{PDMy}(t)$ are obtained by performing product demodulations of V(t) with respect to $\cos(\omega_o t+\psi_x)$ and with respect to $\cos(\omega_o t+\psi_y)$ (or with respect to replicas of the periodic functions being used).

$$S_{PDMx}(t)=K_{PDM}R_x(t)$$

$$S_{PDMy}(t)=K_{PDM}R_y(t) \quad (13)$$

where $K_{PDM}$ is a constant.

For one form of time-division multiplexing, $\omega_{xr}$ and $\omega_{yr}$ have the same value $\omega_o$ with $\omega_o$ being greater than about 6$\omega$ and $\psi_{xr}$, and $\psi_{yr}$ are equal to an arbitrary number $\psi_o$. The voltages $V_{mxr}(t)$ and $V_{myr}(t)$ are proportional to square waves which take on values of 0 and 1, only one of which being equal to 1 at any given time and the duration of a "1" value being equal to an integer times 2 $\pi/\omega$. The voltages $V_{cx}(t)$, and $V_{cy}(t)$ are both equal to a constant. The signals $S_{TDMx}(t)$ and $S_{TDMy}(t)$ are obtained by performing a product demodulation of V(t) with respect to $\cos(\omega_o t+\psi_o)$ (or replica) followed by parallel multiplications with $V_{mxr}(t)$ and $V_{myr}(t)$:

$$S_{TDMx}(t)=K_{TDM}V_{mxr}(t)R_x(t)$$

$$S_{TDMy}(t)=K_{TDM}V_{myr}(t)R_y(t) \quad (14)$$

where $K_{TDM}$ is a constant. It should be noted that $R_x(t)$ and $R_y(t)$ are available only when $V_{mxr}(t)$ and $V_{myr}(t)$ are non-zero.

The same results are obtained (except possibly for the value of the constant $K_{TDM}$) if $V_{mxr}(t)$, $V_{myr}(t)$, $V_{cx}(t)$ and $V_{cy}(t)$ are proportional to square waves which take on values of 0 and 1, only one of the square waves being equal to 1 at any given time, and the duration of a "1" value being equal to an integer times 2 $\pi/\omega$. This mode of operation may be desirable in that it completely isolates the forcing voltages $V_{cx}(t)U_{xp}(t)$, $V_{cx}(t)U_{xn}(t)$, $V_{cy}(t)U_{yp}(t)$, and $V_{cy}(t)U_{yn}(t)$ from each other and from the excitation voltages $V_{mxr}(t)\cos(\omega_o t+\psi_o)$ and $V_{myr}(t)\cos(\omega_o t+\psi_o)$.

For another form of time-division multiplexing, $\omega_o$ equals 0 and $V_{mxr}(t)$, $V_{myr}(t)$, $V_{cx}(t)$, and $V_{cy}(t)$ are proportional to square waves which take on values of 0 and 1, only one of the square waves being equal to 1 at any given time, and the duration of a "1" value being equal to an integer times $2\pi/\omega$. Multiplying V(t) in parallel operations by $V_{mxr}(t)$ and by $V_{myr}(t)$ gives the same results as in the first form of time-division multiplexing.

For code-division multiplexing, $\omega_{xr}$, $\omega_{yr}$, $\psi_{xr}$, $\psi_{yr}$ are all equal to 0, $V_{cx}(t)$, and $V_{cy}(t)$ are constants, and $V_{mxr}(t)$ and $V_{myr}(t)$ are proportional to square waves which take on pseudo-random sequences of values of $-1/T$ and $1/T$ and satisfy the following conditions:

$$\int_T V_i V_j dt = \begin{cases} 1; & i = j \\ 0; & i \neq j \end{cases} \quad (15)$$

where the subscripts i and j stand for any of the subscripts mxr, myr, cx, and cy. The integration time interval T should be less than $2\pi/3\omega$. The signals $S_{CDMx}(t)$ and $S_{CDMy}(t)$ are obtained by separately multiplying $V(t)$ by $V_{mxr}(t)$ and $V_{myr}(t)$ and then integrating over T:

$$S_{CDMx}(nT) = K_{CDM} R_x(nT)$$

$$S_{CDMy}(nT) = K_{CDM} R_y(nT) \quad (16)$$

where $K_{TDM}$ is a constant and n is an integer. It should be noted that the signals $S_{CDMx}(t)$ and $S_{CDMy}(t)$ provide information concerning the standing-wave parameters at intervals of T.

The voltages $U_x(t)$ and $U_y(t)$ typically may include three components:

$$U_{xp}(t) = U_{axp}(t) + U_{qxp}(t) + U_{rxp}(t)$$

$$U_{xn}(t) = U_{axn}(t) + U_{qxn}(t) + U_{rxn}(t)$$

$$U_{yp}(t) = U_{ayp}(t) + U_{qyp}(t) + U_{ryp}(t)$$

$$U_{yn}(t) = U_{ayn}(t) + U_{qyn}(t) + U_{ryn}(t) \quad (17)$$

where the subscripts a, q, and r identify the amplitude, quadrature and rate control voltages. It is not necessary to isolate these components from one another in all applications. However, if isolation is desired, the following substitutions can be made in the foregoing equations.

$$V_{cax}(t)U_{axp}(t) + V_{cqx}(t)U_{qxp}(t) + V_{crx}(t)U_{rxp}(t) \text{ for } V_{cx}(t)U_{xp}(t)$$

$$V_{cax}(t)U_{axn}(t) + V_{cqx}(t)U_{qxn}(t) + V_{crx}(t)U_{rxn}(t) \text{ for } V_{cx}(t)U_{xn}(t)$$

$$V_{cay}(t)U_{ayp}(t) + V_{cqy}(t)U_{qyp}(t) + V_{cry}(t)U_{ryp}(t) \text{ for } V_{cy}(t)U_{yp}(t)$$

$$V_{cay}(t)U_{ayn}(t) + V_{cqy}(t)U_{qyn}(t) + V_{cry}(t)U_{ryn}(t) \text{ for } V_{cy}(t)U_{yn}(t) \quad (18)$$

With these substitutions, any constraints imposed on $V_{cx}(t)$ and $V_{cy}(t)$ also apply to $V_{cax}(t)$, $V_{cqx}(t)$, $V_{crx}(t)$, $V_{cay}(t)$, $V_{cqy}(t)$, and $V_{cry}(t)$. For example, equations (1) become $$V_{xp}(t) = A_k(2\theta_r)V_{mxr}(t)\cos 2\theta_r \cos(\omega_x t + \psi_{xr}) - A_k(2\theta_r)V_{myr}(t)\sin 2\theta_r \cos(\omega_y t + \psi_{yr}) + V_{cax}(t)U_{axp}(t) + V_{cqx}(t)U_{qxp}(t) + V_{crx}(t)U_{rxp}(t)$$

$$V_{xn}(t) = -A_k(2\theta_r)V_{mxr}(t)\cos 2\theta_r \cos(\omega_x t + \psi_{xr}) + A_k(2\theta_r)V_{myr}(t)\sin 2\theta_r \cos(\omega_y t + \psi_{yr}) + V_{cax}(t)U_{axn}(t) + V_{cqx}(t)U_{qxn}(t) + V_{crx}(t)U_{rxn}(t)$$

$$V_{yp}(t) = A_k(2\theta_r)V_{mxr}(t)\sin 2\theta_r \cos(\omega_x t + \psi_{xr}) + A_k(2\theta_r)V_{myr}(t)\cos 2\theta_r \cos(\omega_y t + \psi_{yr}) + V_{cay}(t)U_{ayp}(t) + V_{cqy}(t)U_{qyp}(t) + V_{cry}(t)U_{ryp}(t)$$

$$V_{yn}(t) = -A_k(2\theta_r)V_{mxr}(t)\sin 2\theta_r \cos(\omega_x t + \psi_{xr}) - A_k(2\theta_r)V_{myr}(t)\cos 2\theta_r \cos(\omega_y t + \psi_{yr}) + V_{cay}(t)U_{ayn}(t) + V_{cqy}(t)U_{qyn}(t) + V_{cry}(t)U_{ryn}(t) \quad (19)$$

Figure 3:
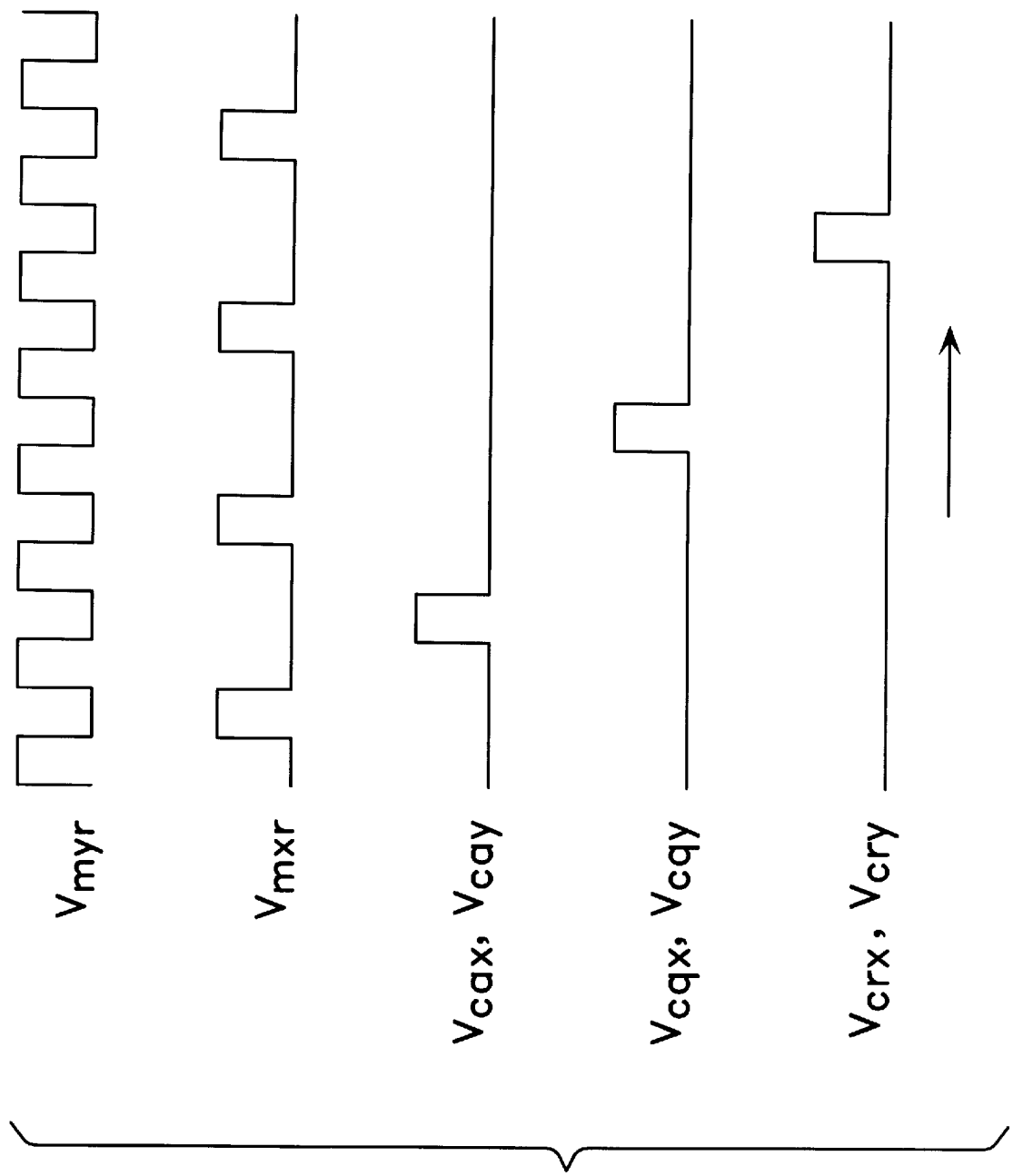
FIG. 3 shows the multiplex control signals for a particular embodiment of the invention.

One possible time-division-multiplex configuration is a sixteen-slot frame of duration $32\pi/\omega$ synchronized to the flexure rate of the resonator. The multiplex control voltages are as shown in FIG. 3. When $\theta_r$ equals $\theta$, the $x_r$ axes coincide with the antinodal axes and the $y_r$ axes coincide with the nodal axes. Eight slots are assigned to reading out the $y_r$ signal component, 4 slots to reading out the $x_r$ signal component, and 1 slot each to applying amplitude, quadrature, and rate forces to the resonator. For a vibration frequency of 4 kHz, readouts of the $x_r$ and $y_r$ signal components would be available at a rate of 2 kHz and 1 kHz respectively. The control voltages would be applied at a rate of 0.25 kHz.

In general, the signals $S_x(t)$ and $S_y(t)$ exiting from the amplifier-demultiplexer 44 have the form $$S_x(t) = K_{Vx} R_x(t)$$

$$S_y(t) = K_{Vy} R_y(t) \quad (20)$$

where $K_{Vx}$ and $K_{Vy}$ each equals $K_V$ except in the case of time-division multiplexing when $K_{Vx}$ equals $K_V V_{mx}(t)$ and $K_{Vy}$ equals $K_V V_{my}(t)$.

In order to extract the standing-wave parameters from the signals $S_x(t)$ and $S_y(t)$, a stable and precise replica of the resonator vibration signal $\cos(\omega t + \phi)$ is required. The replica is obtained from a voltage-controlled oscillator in replica generator 52 wherein the voltage-controlled oscillator is phase-locked to the in-phase standing-wave antinodal signal. The first step of the process is to multiply $S_x(t)$ and $S_y(t)$ first by the replica signal $\cos(\omega_r t + \phi_r)$ and lowpass filter the results and then by the phase-shifted replica $\sin(\omega_r t + \phi_r)$ and lowpass filter the results. The results of this process are:

$$S_{ix}(t) = KA_k(2\theta_r)\{d_i \cos(2\theta - 2\theta_r)\cos[(\omega_r - \omega)t + (\phi_r - \phi)] + \quad (21)$$
$$d_q \sin(2\theta - 2\theta_r)\sin[(\omega_r - \omega)t + (\phi_r - \phi)]\}$$

$$S_{iy}(t) = KA_k(2\theta_r)\{d_i \sin(2\theta - 2\theta_r)\cos[(\omega_r - \omega)t + (\phi_r - \phi)] -$$
$$d_q \cos(2\theta - 2\theta_r)\sin[(\omega_r - \omega)t + (\phi_r - \phi)]\}$$

$$S_{qx}(t) = KA_k(2\theta_r)\{d_i \cos(2\theta - 2\theta_r)\sin[(\omega_r - \omega)t + (\phi_r - \phi)] -$$
$$d_q \sin(2\theta - 2\theta_r)\cos[(\omega_r - \omega)t + (\phi_r - \phi)]\}$$

$$S_{qy}(t) = KA_k(2\theta_r)\{d_i \sin(2\theta - 2\theta_r)\sin[(\omega_r - \omega)t + (\phi_r - \phi)] +$$
$$d_q \cos(2\theta - 2\theta_r)\cos[(\omega_r - \omega)t + (\phi_r - \phi)]\}$$

where K is a constant.

The next step is to form the following combinations of products of the $S_{ix}(t)$, $S_{iy}(t)$, $S_{qx}(t)$, and $S_{qy}(t)$:

$$E = S_{ix}^2 + S_{qx}^2 + S_{iy}^2 + S_{qy}^2 = (KA_k)^2(d_i^2 + d_q^2)$$

$$Q = 2(S_{ix}S_{qy} - S_{iy}S_{qx}) = (KA_k)^2(2d_i d_q)$$

$$R = S_{ix}^2 + S_{qx}^2 - S_{iy}^2 - S_{qy}^2 = (KA_k)^2(d_i^2 - d_q^2)\cos(4\theta - 4\theta_r)$$

$$S = 2(S_{ix}S_{iy} + S_{qx}S_{qy}) = (KA_k)^2(d_i^2 - d_q^2)\sin(4\theta - 4\theta_r)$$

$$L_i = 2(S_{ix}S_{qx} + S_{iy}S_{qy}) = (KA_k)^2(d_i^2 - d_q^2)\sin[2(\omega_r - \omega)t + 2(\phi_r - \phi)] \quad (22)$$

With $L_i(t)$ as the error signal, the phase-locked loop will lock up with the replica phase or equal to $\phi_r$ equal to $\phi$ and $\omega_r$ equal to $\omega$.

The difference between the standing-wave orientation angle and the tracking angle $\theta - \theta_r$, can be determined from the equation $$\tan(4\theta - 4\theta_r) = \frac{S(t)}{R(t)} \quad (23)$$

and the signs of $S_{ix}(t)$ and $S_{iy}(t)$. The quantity $S(t)$ can be used as the error signal in a control loop which generates $\theta_r$ and causes on average $\theta$ to equal $\theta_r$ and $d/dt(\theta - \theta_r)$ to equal 0. The digitally-synthesized tracking angle $\theta_r$ is used in generating $\tan 2\theta_r$ or $\cot 2\theta_r$, depending on the value of $2\theta_r$, which is supplied to the multiplexer 48. The actual value of $\theta$ at any given time is given by $$\theta = \theta_r + \frac{1}{4}\tan^{-1}\frac{S(t)}{R(t)} \approx \theta_r + \frac{1}{4}\frac{S(t)}{R(t)} \quad (24)$$

The difference between E(t) and a specified number is used as the error signal in the amplitude control loop which causes the total energy in the combined inphase and quadrature standing waves, which is proportional to $d_i^2 + d_q^2$, to equal the specified number.

The quantity Q(t) is used as the error signal in the quadrature control loop which results in the quadrature standing-wave amplitude $d_q$ to be zero. When this loop is closed, the amplitude control loop maintains the inphase amplitude $d_i$ at a specified value.

The use of the above control variables can be shown to be optimum. It will be apparent to those skilled in the art that there are many choices of control variables that are suboptimum but still practical.

The outputs of the control unit 50 are the functions $U_{xp}(t)$, $U_{xn}(t)$, $U_{yp}(t)$, and $U_{yn}(t)$ together with the tangent or the cotangent of $2\theta_r$, which are all supplied to multiplexer 48.

Additional details concerning vibratory rotation sensors are contained in U.S. Pat. No. 4,951,508 by Loper, Jr. et al. dated Aug. 28, 1990 which is incorporated by reference.

What is claimed is:

1. A method for reading out a vibratory rotation sensor comprising a resonator which can be sustained in a standing-wave mode of vibration having four antinodes at 90-degree intervals about its circumference, the angular orientation of one of the antinodes with respect to a reference axis fixed with respect to the resonator being denoted by the standing-wave pattern angle θ, the angular orientation of a tracking-angle axis with respect to the reference axis being denoted by the tracking-angle $\theta_r$, the method comprising the steps:

driving the vibratory rotation sensor with a plurality of driving signals, one or more of the driving signals being tracking-angle-dependent driving signals, the functional dependence of all tracking-angle-dependent driving signals being expressible for a specified range of tracking angle values as a single specific function of the tracking angle;

obtaining one or more readout signals resulting from the interaction of the driving signals and the vibratory rotation sensor.

2. The method of claim 1 wherein a tracking-angle-dependent driving signal is the sum of two or more component signals, only one of the component signals being dependent on tracking angle.

3. The method of claim 1 wherein the single specific function specified for any one of a plurality of tracking-angle range of values can be the same as or different than the single specific function specified for any other tracking-angle range of values.

4. The method of claim 1 wherein the single specific function is the tangent of twice the tracking angle.

5. The method of claim 1 wherein the single specific function is the cotangent of twice the tracking angle.

6. The method of claim 1 wherein a readout signal has a functional dependence on both the tracking angle and the difference of the orientation angle of the standing wave pattern associated with the vibratory rotation sensor and the tracking angle.

7. A method of claim 6 wherein a readout signal includes a term expressible as a fraction, the numerator of the fraction including a function of the difference of the orientation angle and the tracking angle, the denominator of the fraction including a function of the tracking angle.

8. The method of claim 7 wherein the numerator is either the sine or the cosine of twice the difference of the the orientation angle and the tracking angle, the denominator being either the sine or the cosine of twice the tracking angle.

9. A method for reading out a vibratory rotation sensor comprising the steps:

driving the vibratory rotation sensor with a plurality of driving signals;

obtaining one or more readout signals resulting from the interaction of the driving signals and the vibratory rotation sensor, the readout signals having a functional dependence on both the tracking angle and the difference of the orientation angle of the standing wave pattern associated with the vibratory rotation sensor and the tracking angle.

10. A method of claim 9 wherein a readout signal includes a term expressible as a fraction, the numerator of the fraction including a function of the difference of the orientation angle and the tracking angle, the denominator of the fraction including a function of the tracking angle.

11. The method of claim 10 wherein the numerator is either the sine or the cosine of twice the difference of the the orientation angle and the tracking angle, the denominator being either the sine or the cosine of twice the tracking angle.

\* \* \* \* \*